(12) United States Patent
Hänsel et al.

(10) Patent No.: US 6,540,297 B2
(45) Date of Patent: Apr. 1, 2003

(54) ADJUSTER FOR A VEHICLE SEAT

(75) Inventors: Richard Hänsel, Flonheim (DE); Andreas Rueth, Kaiserslautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/242,215

(22) Filed: Sep. 12, 2002

(65) Prior Publication Data
US 2003/0015904 A1 Jan. 23, 2003

Related U.S. Application Data

(63) Continuation of application No. PCT/EP01/12000, filed on Oct. 17, 2001.

(30) Foreign Application Priority Data

Oct. 20, 2000 (DE) .......................................... 100 52 092

(51) Int. Cl.⁷ ................................................. B60N 2/02
(52) U.S. Cl. ................................. 297/367; 297/354.12
(58) Field of Search ................................. 297/367, 366, 297/354.12, 354.1, 378.1

(56) References Cited

U.S. PATENT DOCUMENTS

| | | |
|---|---|---|
| 3,788,698 A | 1/1974 | Perkins |
| 4,146,267 A | 3/1979 | Mori et al. |
| 4,337,978 A | 7/1982 | Kazaoka et al. |
| 4,732,425 A * | 3/1988 | Terada et al. |
| 5,338,093 A | 8/1994 | Ikegaya et al. |
| 5,340,196 A | 8/1994 | Ikegaya et al. |
| 5,678,895 A * | 10/1997 | Matsuura et al. |
| 5,702,156 A | 12/1997 | Takagi |
| 6,033,022 A * | 3/2000 | Bauer et al. |
| 6,209,955 B1 * | 4/2001 | Seibold |

FOREIGN PATENT DOCUMENTS

| | | |
|---|---|---|
| DE | 2 254 841 | 6/1973 |
| DE | 30 16 036 A1 | 11/1980 |
| EP | 0 506 580 A1 | 9/1992 |
| EP | 0 776 781 A2 | 6/1997 |
| FR | 2 730 960 A1 | 8/1996 |
| JP | 1218407 | 8/1989 |

* cited by examiner

*Primary Examiner*—Laurie K. Cranmer
(74) *Attorney, Agent, or Firm*—Alston & Bird LLP

(57) ABSTRACT

In an adjuster (101) for a vehicle seat, in particular a hinged fitting functioning as an inclination adjuster for a motor vehicle rear seat bank, having a first adjuster part (105), a second adjuster part (108) mounted such that it can move relative to the first adjuster part (105), and a pawl which is pivotably mounted on the first adjuster part (105) and interacts with the second adjuster part (108) in order to lock the adjuster (101), the bearing device (113) of the pawl is supported on the bearing device (110) of the second adjuster part (108).

22 Claims, 2 Drawing Sheets

ADJUSTER FOR A VEHICLE SEAT

CROSS-REFERENCE TO RELATED APPLICATION

This is a continuation of International Application No. PCT/EP01/12000, which was filed Oct. 17, 2001, was published in German on May 5, 2002, designates the U.S., and is incorporated herein by reference.

BACKGROUND OF THE INVENTION

The present invention relates to an adjuster for a vehicle seat.

With a known adjuster for a vehicle seat, which is designed as a hinged fitting, the inclination of the backrest of a vehicle seat in the rear passenger compartment of a motor vehicle can be adjusted. In the event of a crash, forces are introduced by the backrest into the structure of the seat part via the hinged fitting. The pawl and the further locking elements are subjected to these higher forces and therefore have to be dimensioned strongly.

BRIEF SUMMARY OF THE INVENTION

The present invention is based on the object of improving vehicle seat adjusters. According to one aspect of the invention, an adjuster for a vehicle seat includes first and second adjuster parts, with the second adjuster part mounted by a bearing device for moving relative to the first adjuster part. The adjuster further includes a pawl pivotably mounted on the first adjuster part by a bearing device, for interacting with the second adjuster part to lock the adjuster. In addition, a support is mounted to both the bearing device of the second adjuster part and the bearing device of the pawl, with the support functioning so that the bearing device of the pawl is supported by the bearing device of the second adjuster part.

The fact that the bearing device of the pawl is supported on the bearing device of the second adjuster part means that in the event of a crash, the bearing device of the pawl is not loaded differently from the bearing device of the second adjuster part. The interaction between the pawl and the second adjuster part, for example a tooth engagement, is maintained unchanged. Given the same level of safety, the components of the bearing device, in particular the actual bearing, can be dimensioned to a lower level. This reduces the weight of the adjuster and simplifies and cheapens production, in particular of the first adjuster part. For example, the first adjuster part can be produced from thin sheet metal with a constant thickness. If the adjuster is constructed as a hinged fitting, that is to say as a backrest adjuster, the support is preferably provided between a backrest pin forming the backrest axis of rotation and a ratchet pin which carries the pawl, as a result of which the bearing of the ratchet pin is relieved of load.

In a preferred embodiment, the support is designed as a lug, which is seated both on the backrest pin and on the ratchet pin. Such a lug can be produced and mounted simply and cost-effectively. In order to be able better to absorb and pass on the forces which occur, the lug is preferably produced from high-strength steel. For symmetrical transmission of the force to the backrest pins, two lugs are preferably provided, which each have to absorb at most half of the forces occurring. In particular, if the lower part of the fitting is designed as a hollow profile, in whose interior the pawl is arranged, one lug can be arranged on each of the outer sides of the lower part of the fitting, so that no installation space has to be created in the interior of the lower part of the fitting. In addition, the lugs then support the end sections of the ratchet pin, so that the forces that occur act with the smallest possible lever arm. When the lower part of the fitting is designed as a hollow profile, it has an at least partly closed form with an internal space to accommodate the locking and securing elements.

The adjuster according to the invention is preferably used as a hinged fitting in a rear seat bank in the rear passenger compartment of a motor vehicle, for example a van, but the hinged fitting could also be used in a front passenger seat or in further rows of seats. Such a hinged fitting can additionally be provided with a control cam which interacts with the pawl in order to be able to control the possible sitting positions and a table position. Furthermore, there may be play-cancelling means.

BRIEF DESCRIPTION OF THE DRAWING

In the following text, the invention is explained in more detail with reference to an exemplary embodiment which is illustrated in the drawing, in which.

DETAILED DESCRIPTION OF THE INVENTION

Figure 2:
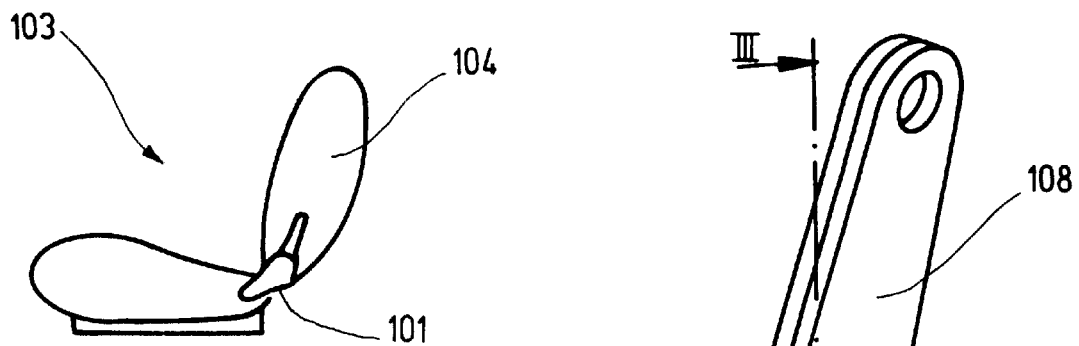
FIG. 2 shows a schematic side view of a vehicle seat.
Figure 1:
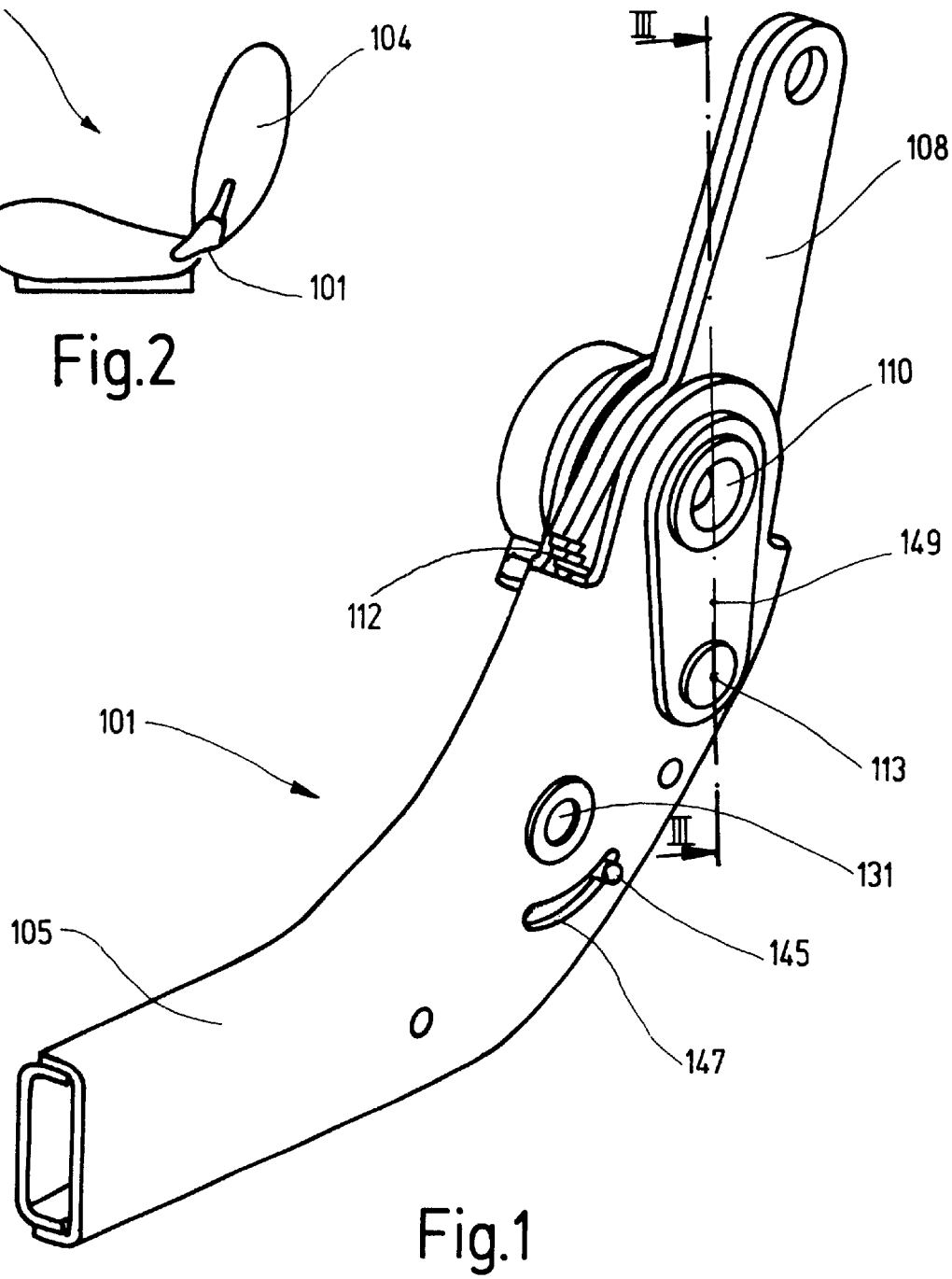
FIG. 1 shows a perspective view of the exemplary embodiment.
Figures 3, 4:
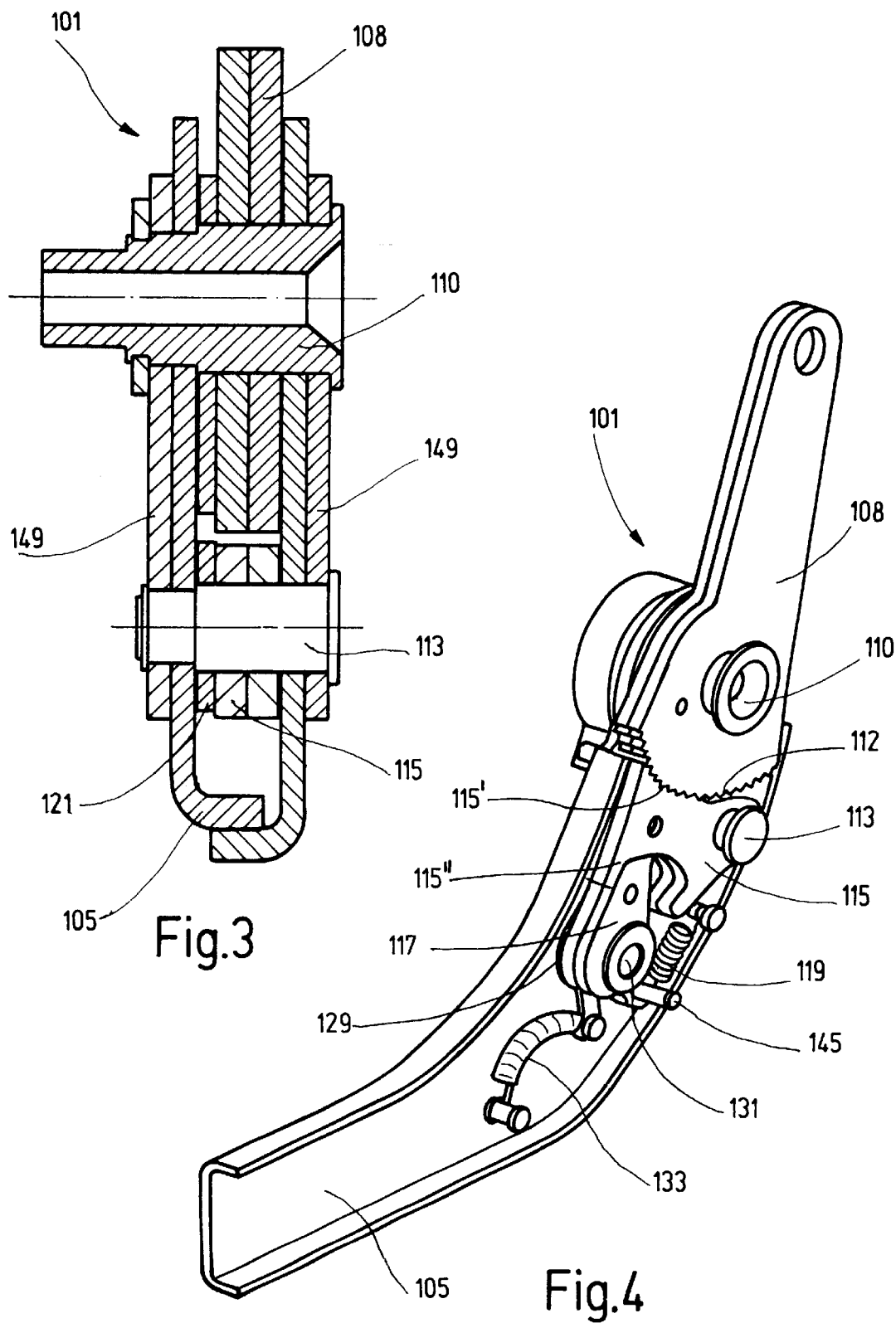
FIG. 3 shows a section along the line III—III in FIG. 1.
FIG. 4 shows a partly sectioned illustration of the exemplary embodiment, corresponding to FIG. 1.

The exemplary embodiment relates to a hinged fitting 101 for a rear seat bank 103 belonging to a motor vehicle, whose arrangement in the motor vehicle and whose normal direction of travel define the following directional statements. The hinged fitting 101 is an inclination adjuster for the backrest 104, and it is designed as a latching fitting. On both sides of the rear seat bank 103 or, in the case of a design with a ⅓–⅔ backrest, on the outer sides or on both sides of the corresponding parts of the backrest 104, a hinged fitting 101 is provided in each case. By way of the hinged fitting 101, the backrest 104 can assume a plurality of different seating positions and a table position. Each hinged fitting 101 has a lower fitting part 105, which is permanently fitted to the seat-part structure of the rear seat bank 103, and an upper fitting part 108, which is permanently fixed to the structure of the backrest 104. The lower fitting part 105 is designed in two parts, the two parts being joined by the overlapping edge region to form a hollow profile. The upper fitting part 108 is rotatably mounted in the lower fitting part 105 by way of a backrest pin 1 10 that defines an axis of rotation aligned in the y direction (that is to say horizontally and transversely with respect to the direction of travel), as a result of which the backrest 104 of the rear seat bank 103 can be pivoted relative to the seat part of the rear seat bank 103.

At its lower end, facing away from the backrest 104, the upper fitting part 108 bears a toothed ring 112 concentric with the backrest pin 110. On the lower fitting part 105, a pawl 115 is pivotably mounted on a ratchet pin 113 fixed to the lower part. The pawl 115 has a toothing system 115', which is aligned approximately with the backrest pin 110 and which can interact with the toothed ring 112 located in the same plane. If the rear seat bank 103 is in a seating position, then the toothed ring 112 is within the pivoting range of the pawl 115. At this inclination of the backrest 104, the toothing system of the spring-loaded pawl 115 engages in the toothed ring 112 and, as a result, locks the hinged fitting 101. The toothed ring 112 extends over a large angular range so that there are a plurality of lockable seating positions. That is, a plurality of inclinations of the backrest 104 are possible.

For the event of a crash, the pawl 115 is secured by a cam-like catching piece 117 pivotably mounted on the lower fitting part 105. The catching piece 117 is biased in the direction of the pawl 115 by a catching-piece spring 119 and rests as a stop on a ratchet arm 115" that projects radially. There are two of each of the upper fitting part 108, the pawl 115 and the catching piece 117. That is, two identically designed halves of these components arranged in the x-z plane are arranged beside each other in the y direction and between the two walls of the hollow profiled lower fitting part 105, in order to be able to absorb and pass on the forces that occur.

In the y direction, on one side of the pawl 115, a control piece 121 is firmly fixed to the pawl 115 so as to rotate with it. A clamping piece 129, which is pivotably mounted in the same plane as the control piece 121, is on the same bearing pin 131 as the catching piece 117, and is biased by a bent helical spring 133 belonging to the control piece 121 of the pawl 115. The clamping piece 129 is biased towards the side of the control piece 121 facing away from the toothing system 115'. Via an eccentrically curved clamping surface, the clamping piece 129 presses against the control piece 121, which is flat at this point, as a result of which the toothing system 115' of the pawl 115 is forced without play into the toothed ring 112.

Fitted off-center to the catching piece 117 is an unlocking pin 145 which projects in the y-direction through a slotted guide 147 in one wall of the lower fitting part 105 and is guided by the slotted guide within the x-z plane. In order to unlock the hinged fitting 101, the unlocking pin 145 is pulled suitably, whereupon the catching piece 117 is pivoted away from the pawl 115 and, after a short pivoting angle, carries the clamping piece 129 along with it via a driver (not illustrated). As a result, the pawl 115 is released and, by way its weight, by way of pressure on the backrest 104 or by way of a driver arm of the catching piece 117, the pawl is forced or lifted out of the toothed ring 112, so that the hinged fitting 101 is unlocked. Locking is carried out via the various spring loadings.

On both sides of the hinged fitting 101, in each case on the outer side of the lower fitting part 105, a pulling lug 149 is provided, which is produced from high-strength steel, for example 25CrMoY. Each of the two pulling lugs 149 is mounted on both the backrest pin 110 and the ratchet pin 113, so that the ratchet pin 113 is supported on the backrest pin 110. The flat, elongated pulling lug 149 tapers slightly from the end mounted on the backrest pin 110 towards the end mounted on the ratchet pin 113.

In the event of a crash, for example in the event of a front crash, the forces arising on the backrest 104 are introduced into the hinged fitting 101 via the upper fitting part 108. Some of the crash forces are passed on to the pawl 115 via the toothed ring 112 as an opening moment. The catching piece 117, now bearing in the opening direction, prevents the pawl 115 from pivoting about the ratchet pin 113. Without the pulling lugs 149, the level of toothing overlap between the toothing system 115' and the toothed ring 112 would become smaller and smaller at a rolling point which, on account of the catching piece 117, lies in the region of engagement of the teeth of the toothing system 115' located furthest from the ratchet pin 113 and in the corresponding teeth of the toothed ring 112. This is because, without the pulling lugs 149, the pawl 115 would be forced backwards on account of its loading, so that a corresponding slot-like deformation in the lower fitting part 105 would be produced, while at the same time another part of the crash forces would pull the backrest pin 110 forwards via the upper fitting part 108 loaded forwards by a torque, so that another, in particular differently oriented, slot-like deformation in the lower fitting part 105 would be produced. Without the pulling lugs 149, therefore, starting from the end remote from the rolling point and going in the direction of the rolling point, the teeth of the toothing system 115' and of the toothed ring 112 would be moved away from one another, reducing the level of overlap.

By way of the pulling lugs 149, the ratchet pin 113 is held at a constant distance from the backrest pin 110, so that in the event of a crash the ratchet pin 113 is pulled upwards behind the backrest pin 110, and therefore the tooth engagement between the toothing system 115' and the toothed ring 112 is maintained not only in the region of the rolling point but completely or virtually completely. Then, in the region of the bearing of the ratchet pin 113 and of the backrest pin 110, the lower fitting part 105 does not have to be specially reinforced in order to avoid the slot-like deformations in the event of a crash. Instead, the lower fitting part 105 can be formed from sheet steel with a constant, low thickness, for example from QStE460. The crash forces are ultimately introduced via a common, equally large and synchronous deformation in the same direction of the lower fitting part 105, through the backrest pin 110 and the ratchet pin 113 into the lower fitting part 105, onward into the seat part structure and finally into the vehicle structure.

That which is claimed:

1. A hinged fitting for a vehicle seat having a backrest that can pivot about a backrest axis of rotation relative to a seat part of the vehicle seat, the hinged fitting comprising:
   a lower fitting part that at least partially defines and encloses a hollow interior space,
   an upper fitting part mounted by a backrest pin to the lower fitting part for pivoting about the backrest axis of rotation,
   a pawl positioned within the interior space of the lower fitting part, wherein the pawl is mounted by a ratchet pin to the lower fitting part for pivoting toward and interacting with the upper fitting part to lock the hinged fitting,
   a first lug positioned at a first outer side of the lower fitting part and mounted to both the backrest pin and the ratchet pin, so that the ratchet pin is supported by the backrest pin, and
   a second lug positioned at a second outer side of the lower fitting part and mounted to both the backrest pin and the ratchet pin, so that the ratchet pin is further supported by the backrest pin.

2. A hinged fitting according to claim 1, wherein the pawl is formed as two separate pieces that are substantially identical and arranged beside each other within the interior of the lower fitting part.

3. A hinged fitting according to claim 1, wherein for each of the first and second lugs:
   the lug includes opposite first and second ends,
   the first end of the lug is mounted to the backrest pin,
   the second end of the lug is mounted to the ratchet pin, and
   the lug tapers so as to become narrower when moving in a direction from the first end toward the second end.

4. A hinged fitting according to claim 1, in combination with the vehicle seat, with the lower fitting part mounted to the seat part of the vehicle seat and the upper fitting part mounted to the backrest of the vehicle seat.

5. A hinged fitting according to claim 1, wherein the first and second lugs are produced from high-strength steel.

6. A hinged fitting according to claim 5, wherein the lower fitting part is produced from thin sheet metal with a constant thickness.

7. A hinged fitting according to claim 1, further comprising:
   a control mechanism positioned within the interior space of the lower fitting part, wherein the control mechanism biases the pawl toward the upper fitting part so that teeth of the pawl mesh with teeth of the upper fitting part to lock the hinged fitting, and
   an unlocking mechanism for overcoming the biasing of the control mechanism so that the pawl pivots away from the upper fitting part to unlock the hinged fitting, wherein a portion of the unlocking mechanism extends from the interior space of the lower fitting part to outside of the lower fitting part.

8. A hinged fitting according to claim 7, wherein the portion of the unlocking mechanism extends through an opening in a wall of the lower fitting part.

9. A hinged fitting for a vehicle seat having a backrest that can pivot about a backrest axis of rotation relative to a seat part of the vehicle seat, the hinged fitting comprising:
   a lower fitting part defining a hollow interior space and including at least first and second portions that are positioned on opposite sides of, and at least partially enclose, the interior space, with each of the first and second portions of the lower fitting part having an outer side that faces away from the interior space,
   an upper fitting part mounted by a backrest pin to the lower fitting part for pivoting about the backrest axis of rotation, wherein the backrest pin is mounted to both of the first and second portions of the lower fitting part,
   a pawl at least partially positioned in the interior space of the lower fitting part, wherein the pawl is mounted by a ratchet pin to the lower fitting part for pivoting toward and interacting with the upper fitting part to releasably lock the hinged fitting, and wherein the ratchet pin is mounted to both of the first and second portions of the lower fitting part, and
   a support positioned at the outer side of the first portion of the lower fitting part, wherein the support is mounted to both the backrest pin and the ratchet pin, so that the ratchet pin is supported by the backrest pin.

10. A hinged fitting according to claim 9, wherein the first and second portions of the lower fitting part are joined to one another so that the lower fitting part extends substantially completely around both the interior space of the lower fitting part and the pawl.

11. A hinged fitting according to claim 9, wherein the pawl is formed as two separate pieces that are substantially identical and arranged beside each other within the interior space of the lower fitting part.

12. A hinged fitting according to claim 9, wherein the upper fitting part is formed as two separate pieces that are substantially identical and arranged beside each other within the interior space of the lower fitting part.

13. A hinged fitting according to claim 9, in combination with the vehicle seat, with the lower fitting part mounted to the seat part of the vehicle seat and the upper fitting part mounted to the backrest of the vehicle seat.

14. A hinged fitting according to claim 9, wherein the support is a lug which is seated on both the backrest pin and the ratchet pin.

15. A hinged fitting according to claim 14, wherein the lug includes opposite first and second ends, the first end of the lug is mounted to the backrest pin, the second end of the lug is mounted to the ratchet pin, and the lug tapers so as to become narrower when moving in a direction from the first end toward the second end.

16. A hinged fitting according to claim 14, wherein the lug is produced from high-strength steel.

17. A hinged fitting according to claim 9, further comprising:
   a control mechanism positioned within the interior space of the lower fitting part, wherein the control mechanism biases the pawl toward the upper fitting part so that teeth of the pawl mesh with teeth of the upper fitting part to lock the hinged fitting, and
   an unlocking mechanism for overcoming the biasing of the control mechanism so that the pawl pivots away from the upper fitting part to unlock the hinged fitting, wherein a portion of the unlocking mechanism extends from the interior space of the lower fitting part to outside of the lower fitting part, by extending through an opening extending through either the first portion of the lower fitting part or the second portion of the lower fitting part.

18. A hinged fitting according to claim 17, wherein the control mechanism includes a catching piece that is pivotably mounted to the lower fitting part for holding the pawl against the upper fitting part, so that the teeth of the pawl remain meshed with teeth of the upper fitting part to lock the hinged fitting, and wherein the catching piece is formed as two separate pieces that are substantially identical and arranged beside each other within the interior space of the lower fitting part.

19. A hinged fitting according to claim 9, wherein the support is a first support, and further comprising a second support mounted at the outer side of the second portion of the lower fitting part to both the backrest pin and the ratchet pin, so that the ratchet pin is further supported by the backrest pin.

20. A hinged fitting according to claim 19, wherein the first and second portions of the lower fitting part are joined to one another so that the lower fitting part extends substantially completely around both the interior space and the pawl.

21. A hinged fitting according to claim 19, wherein each of the first and second supports is a lug which is seated on both the backrest pin and the ratchet pin.

22. A hinged fitting according to claim 21, wherein each lug is produced from high-strength steel, and the first and second portions of the lower fitting part are each produced from thin sheet metal with a constant thickness.

* * * * *